(12) United States Patent
Wei et al.

(10) Patent No.: US 9,924,081 B2
(45) Date of Patent: Mar. 20, 2018

(54) ARRAY LENS MODULE

(71) Applicants: Hui Wei, L.A., CA (US); Yunqiang Xu, Shenzhen (CN)

(72) Inventors: Hui Wei, L.A., CA (US); Yunqiang Xu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 0 days.

(21) Appl. No.: 15/225,388

(22) Filed: Aug. 1, 2016

(65) Prior Publication Data

US 2017/0099418 A1   Apr. 6, 2017

(30) Foreign Application Priority Data

Oct. 6, 2015  (CN) .......................... 2015 1 0642815

(51) Int. Cl.
| | |
|---|---|
| G02B 13/16 | (2006.01) |
| H04N 5/225 | (2006.01) |
| G02B 3/00 | (2006.01) |
| G02B 5/20 | (2006.01) |
| G02B 1/11 | (2015.01) |
| G02B 1/18 | (2015.01) |

(52) U.S. Cl.
CPC ............ *H04N 5/2254* (2013.01); *G02B 1/11* (2013.01); *G02B 1/18* (2015.01); *G02B 3/0031* (2013.01); *G02B 3/0062* (2013.01); *G02B 5/208* (2013.01); *H04N 5/2252* (2013.01); *H04N 5/2253* (2013.01)

(58) Field of Classification Search
CPC ........ B60J 3/04; G02F 1/0121; G02F 1/0147; G02F 1/0126; H04N 13/0415
USPC ................. 348/335, 340, 345, 348, 350, 352
See application file for complete search history.

(56) References Cited

U.S. PATENT DOCUMENTS

| | | | |
|---|---|---|---|
| 2014/0133699 A1* | 5/2014 | Guan ................. | G06K 9/00798 382/103 |
| 2014/0232983 A1* | 8/2014 | Tokumaru ................ | G02C 7/10 351/159.56 |

* cited by examiner

*Primary Examiner* — Yogesh Aggarwal
(74) *Attorney, Agent, or Firm* — Na Xu; IPro, PLLC

(57) ABSTRACT

An array lens module includes a housing, an image sensor with photosensitive area and a lens module installed inside the housing. The lens module is formed by at least two pieces glass lens. The first lens with the first imaging area and the second lens with the second imaging area are molded on the lens module. The image processor is respectively capturing the first image area and the second image area by a certain length-width ratio in the first imaging area and the second imaging area. A parallax between image in the first image area and image in the second image area is accordingly generated. The lens module is all-glass structure with a high transmittance and excellent achromatization performances.

9 Claims, 5 Drawing Sheets

ARRAY LENS MODULE

FIELD OF THE INVENTION

The present disclosure relates to a lens module, specifically relates in particular to an array lens module for a mobile electronic device.

DESCRIPTION OF RELATED ART

The electronic devices are continuously developing toward intelligentization with continuous development of science and technology. The electronic devices such as pads and mobile phones are also installed with lens modules besides the digital camera. Higher requirements are raised on quality of the images of objects shot with lens modules, in order to meet the demands from people. Besides, installing 3D cameras on these mobile electronic devices also becomes a development trend with development of 3D imaging technology.

Two lens groups are used in a 3D lens module of relevant technology to imitate the imaging functions of human eyes, so as to shoot pictures of a certain depth-of-field. Both two lens modules comprise lens barrel with loophole and lens set inside the lens barrel. Lens set comprises at least two pieces optical lenses. Straight lines passing by geometric center of the loophole and the optical axis of these optical lenses should coincide. That is, a high coaxiality should be guaranteed. But the eccentricity between optical lenses is very sensitive. Therefore, it's very difficult to guarantee a high coaxiality and stability. But because the two lens modules are separately assembled. They have their respective lens barrels. So the assembling accuracy cannot be guaranteed during assembling due to influences from tolerance of lens barrel.

Therefore, it's necessary to provide a new lens module.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
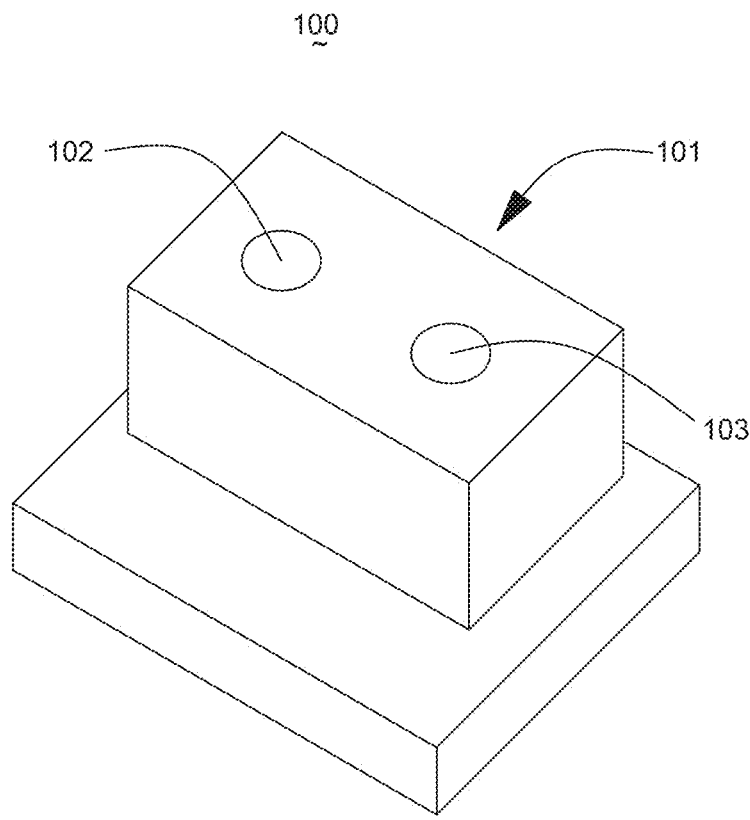
FIG. 1 is a schematic diagram of an array lens module in accordance with an exemplary embodiment of the present disclosure.
Figure 2:
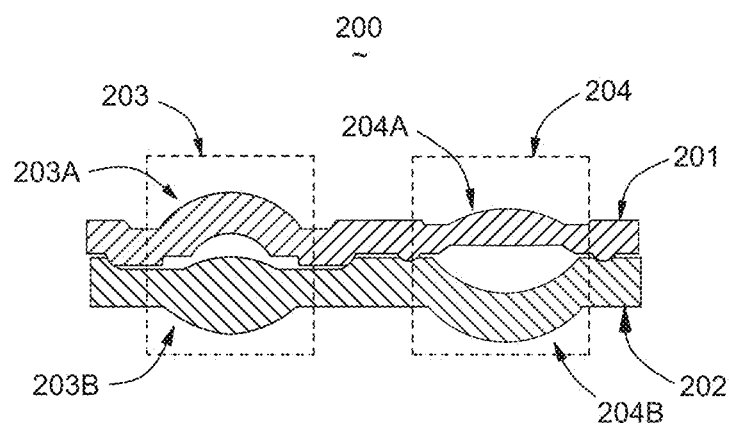
FIG. 2 is a schematic diagram of a lens module in the array lens module in FIG. 1.

As shown in FIGS. 1-2, an array lens module 100 comprises a housing 101, an image processor inside the housing 101, an image sensor electrically connected with the image processor and a lens module 200 installed on the image sensor. The housing 101 comprises an isolated first aperture 102 and a second aperture 103.

In the embodiment, the lens module 200 comprises a glass lens having a first lens 203 and a second lens 204 stacked on the first lens 203 (as shown by the part in the dotted line box in FIG. 2). The first lens 203 and the second lens 204 are respectively used for imitating the imaging functions of the left eye and right eye of human, so as to shoot images with a certain parallax. The two pieces glass lenses are respectively defined as the first glass lens 201 and the second glass lens 202 for the convenience of descriptions.

Figure 3:
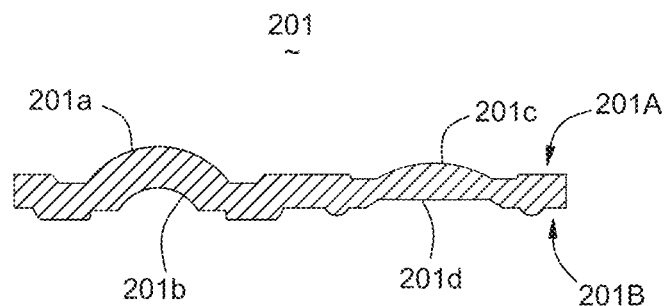
FIG. 3 is a schematic diagram of a first glass lens in the array lens module.

The first glass lens 201 comprises a first optical lens 203A and a second optical lens 204A isolated from the first optical lens. As shown in FIG. 3, the first glass lens 201 comprises a first surface 201A and a second surface 201B opposite to the first surface 201A. The first optical lens 203A comprises a first optical surface 201$a$ installed on the first surface 201A and a second optical surface 201$b$ installed on the second surface 201B. The positions of the second optical surface 201$b$ and the first optical surface 201$a$ are corresponding. This means the optical center of the second optical surface 201$b$ is aligned to the optical center of the first optical surface 201$a$. The second optical lens 204A comprises third optical surface 201$c$ installed on the first surface 201A and the fourth optical surface 201$d$ installed on the second surface 201B. The positions of the fourth optical surface 201$d$ and the third optical surface 201$c$ are corresponding. This also means the optical center of the fourth optical surface 201$d$ is aligned to the optical center of the third optical surface 201$c$.

Figure 4:
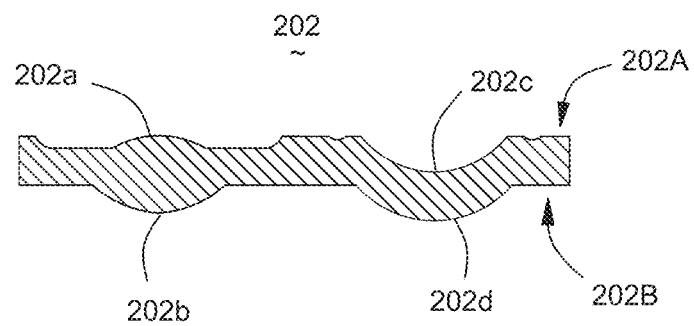
FIG. 4 is a schematic diagram of a second glass lens in the array lens module.

The same, the second glass lens 202 comprises a first optical lens 203B and a second optical lens 204B isolated from the first optical lens 203B. The positions of the first optical lens 203B and the second optical lens 204B are respectively corresponding to the positions of the first optical lens 203A and the second optical lens 204A. As shown in FIG. 4, the second glass lens 202 comprises a first surface 202A and a second surface 202B opposite to the first surface 202A. The first optical lens 203B comprises a first optical surface 202$a$ installed on the first surface 202A and the second optical surface 202$b$ installed on the second surface 202B. The positions of the second optical surface 202$b$ and the first optical surface 202$a$ are corresponding to each other. The optical centers of the two are aligned. The second optical lens 204B comprises a third optical surface 202$c$ installed on the first surface 202A and a fourth optical surface 202d installed on the second surface 202B. The positions of the fourth optical surface 202d and the third optical surface 202c are corresponding to each other. The optical centers of the two are aligned.

The first lens 203 comprises the first optical lens 203A on the first glass lens 201 and the first optical lens 203B on the second glass lens 202 by combining. Usually a gap exists between the first optical lens 203A and the first optical lens 203B. This gap is for storing the optical components as anti-dazzling screen, etc. The second lens 204 comprises the second optical lens 204A on the first glass lens 201 and the second optical lens 204B on the second glass lens 202 by combining. A gap also exists between the second optical lens 204A and the second optical lens 204B.

The image sensor inside housing 101 should at least cover the first lens 203 and the second lens 204. The geometric center of the first aperture 102 should fall on the first optical axis A1 after installing the lens module 200 into housing 101. The geometric center of the second aperture 103 should fall on the second optical axis A2.

Although the first glass lens 201 comprises the first optical lens 203A and the second glass lens 202 also comprises the first optical lens 203B, they have different optical characteristics. The optical characteristics and shapes of their respective first optical surface and second optical surface are different either. In the same way, although the first glass lens 201 comprises the second optical lens 204A and the second glass lens 202 also comprises the second optical lens 204B, they have different optical characteristics. The optical characteristics and shapes of their respective third optical surface and fourth optical surface are different either. Determine according to specific requirements from the lens module.

In addition, the surface of the first glass lens 201 and the second glass lens 202 could also be painted with antireflection antifogging coating (AR coating) and/or infrared cut coating (IR coating). So as to further achieve a higher light transmittance and excellent achromatization performances. The AR coating and IR coating should at least cover the first lens 203 and the second lens 204.

The aforementioned is description of structure to the array lens module 100 disclosed in the present disclosure, and the description of its principle is explained as below:

The image sensor usually comprises a photosensitive area. The first lens 203 comprises the first imaging area. The second lens 204 comprises the second imaging area. Image will be formed in corresponding area of the image sensor after the light reflected by the object shot penetrating the first lens 203 and the second lens 204. The photosensitive area in the optimal example of embodiment in the present disclosure is in rectangle. The first imaging area and the second imaging area are in circle. The first imaging area and the second imaging area should completely cover the photosensitive area as much as possible, in order to maximize the utilization rate of the image sensor. The image processor is respectively capturing images from the first imaging area and the second imaging area by a certain length-width ratio. Then output to the first image area and the second image area. Parallax exists between images in the first image area and images in the second image area. Therefore, images comprise depth-of-field could be combined. Then realize the 3D shooting effect of the lens module. The length-width ratio for the image area captured by the image processor could be 4:3, and 16:9, etc. Images with high resolutions could be achieved through selecting pixel size of image sensor and capture length-width ratio of the image processor.

Figure 5:
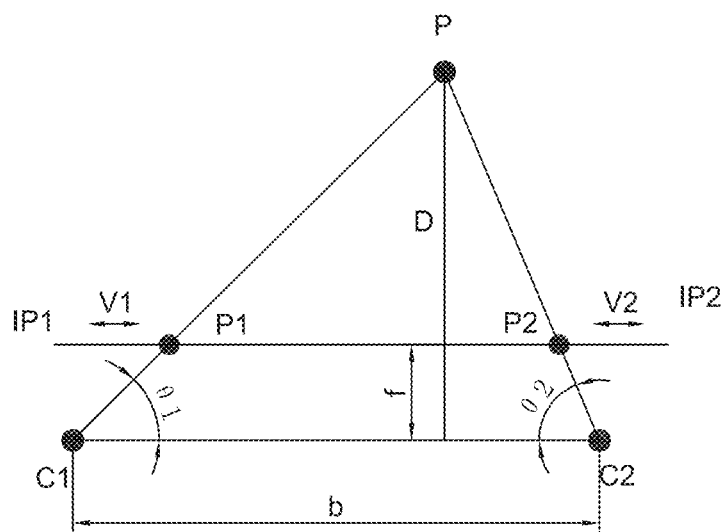
FIG. 5 shows a 3D imaging schematic diagram of the array lens module.

FIG. 5 shows a 3D imaging schematic diagram of the array lens module 100 disclosed in the present disclosure. C1 and C2 respectively represent the first lens 203 and the second lens 204. P indicates the object shot, D indicates the depth-of-field, f indicates the focal length, b indicates the distance between the first lens 203 and the second lens 204, V1 indicates the imaging position of the object shot at a certain point on the first lens 203, V2 indicates the imaging position of the object shot at the same point on the second lens 204, and the difference between the two is called as visual angle difference.

As for $D/(D-f)=b/(b-(V1-V2))$

So, $D=bf/(V1-V2)$

The depth-of-field D of the array lens module 100 could be calculated from the above formula.

The aforementioned is only one optimal example of embodiment of the present disclosure. The glass lens could be three pieces, four pieces or even more in the other possible embodiment examples. Its working principles and structure are similar to the lens module with two pieces glass lenses, which will not be mentioned here.

In addition, the varying degrees of depth-of-field could also be achieved through changing the corresponding position relations between the first image area (the first lens) and the second image area (the second lens) on the image sensor.

Figure 6:
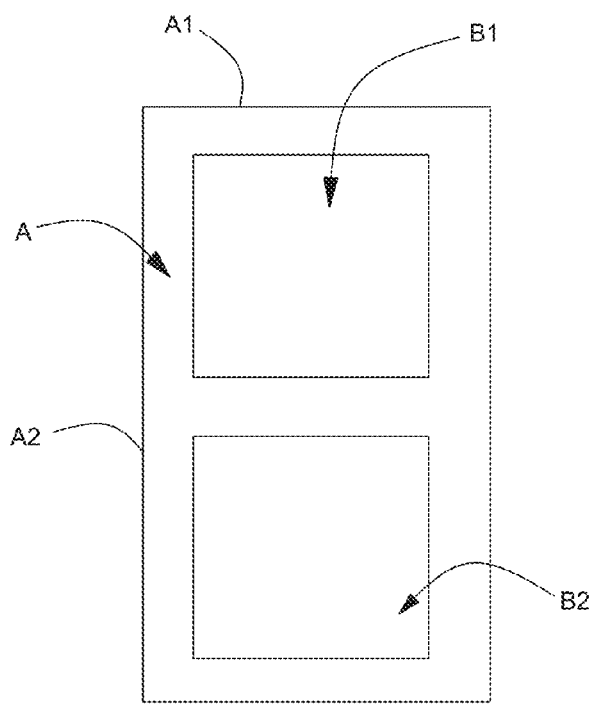
FIG. 6 is a positional relationship diagram between a photosensitive area, a first image area and a second image area in the array lens module.

As shown in FIG. 6, A represents the photosensitive area of the image sensor. It comprises the parallel first side edges A1 and the second side edge A2 connected with the two first side edges A1. B1 represents the first image area captured by the image processor, B2 represents the second image area captured by the image processor, and both of them are in rectangle. The connecting lines between geometric centers of the two are parallel to the first side edges A1. That is, the first image area B1 and the second image area B2 are at horizontal positions. Now, parallax exists between the first lens 203 and the second lens 204 at horizontal direction.

Figure 7:
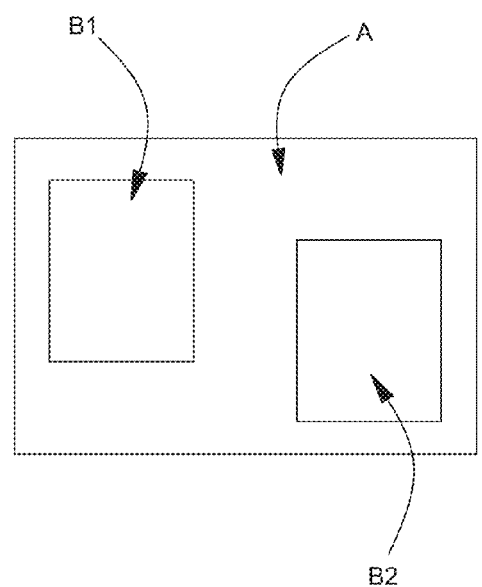
FIG. 7 is another positional relationship diagram between the photosensitive area, the first image area and the second image area in the array lens module.

As shown in FIG. 7, A represents the photosensitive area of the image sensor. It comprises the parallel first side edges A1 and the second side edge A2 connected with the two first side edges A1. B1 represents the first image area captured by the image processor, B2 represents the second image area captured by the image processor, and both of them are in rectangle. The connecting lines between geometric centers of the two are parallel to the second side edge A2. That is, the first image area B1 and the second image area B2 are at vertical positions. Now, parallax exists between the first lens 203 and the second lens 204 at vertical direction.

Figure 8:
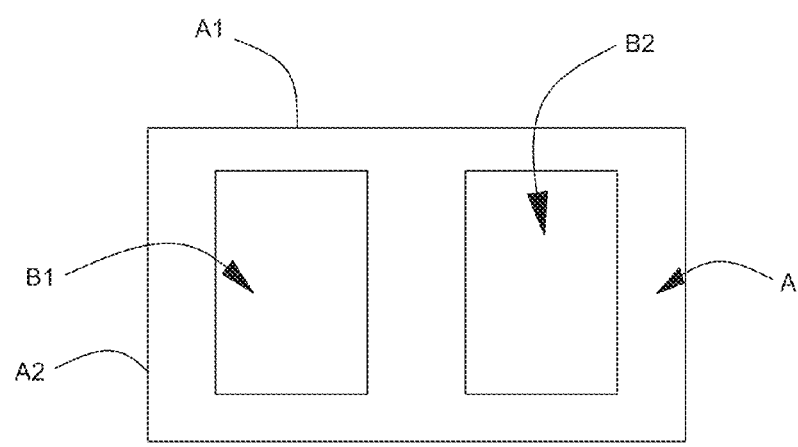
FIG. 8 shows another positional relation diagram between the photosensitive area, the first image area and the second image area in the array lens module.

As shown in FIG. 8, A represents the photosensitive area of the image sensor. B1 represents the first image area captured by the image processor, B2 represents the second image area captured by the image processor, and both of them are in rectangle. Both of them are respectively locating at the diagonal positions of photosensitive area A. Now, parallax exists between the first lens 203 and the second lens 204 at the vertical and horizontal positions.

Figure 9:
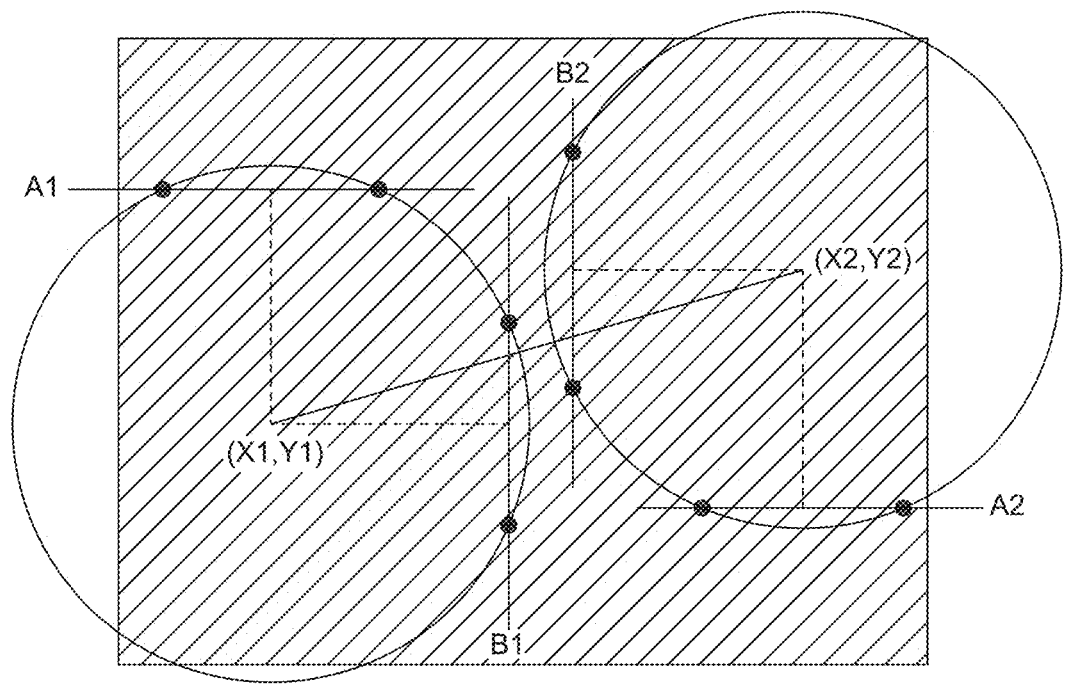
FIG. 9 shows a schematic diagram for determining central points of the first lens and the second lens in the array lens module.

As shown in FIG. 9, the present disclosure also has advantages in easily capturing the central point of lens and easy assembling. During assembling, the central point of lens in the array lens module should coincide with the coordinates of central point set on the image sensor to achieve an image with ideal depth-of-field. The rectangle filled with section lines in FIG. 9 represents the photosensitive area of the image sensor. The two circles indicated with solid lines respectively represent the imaging areas of the first lens 203 and the second lens 204. Because part of the two imaging areas fall in the photosensitive area. Two intersection points will fall in the photosensitive area if straight lines are made in the photosensitive area with the imaging area. In the figure, there are two intersection points between the imaging area of the first lens 203 and the straight line A1, and there are two intersection points between it and the straight line B1. There are two intersection points between the imaging area of the second lens 204 and the straight line A2, and there are two intersection points between it and the straight line B2.

Connect A1 with two intersection points in the imaging area, and make a vertical line through midpoint of the connecting line between two intersection points. Connect B1 with two intersection points in the imaging area, and make a vertical line through midpoint of the connecting line. The intersection point of the two vertical lines will be the central point of imaging area of the first lens 203. The coordinate of the central point is (X1, Y1). The central point (X2, Y2) of imaging area of the second lens 204 could be obtained in the same way. The coordinates of central points of the first lens 203 and the second lens 204 will be recorded in the memory area of the image sensor. Therefore, images of specific sizes will be captured based on the two central points to meet the requirements on depth-of-field. Because the coordinates of central points are obtained by the image sensor after calculations, and images are captured in this way. So the matching requirements on lens are low. That is to say, the image sensor could adapt to the corresponding positional relations of the two lens by means of calculations. Therefore, the matching requirements are significantly reduced.

In addition, more three-dimensional images could also be captured through changing the pixel size of the image sensor. For example, change the pixel size of the image sensor from 1.75 μm to 1.12 μm. While changing the corresponding areas of the first image area or the second image area on the image sensor into black and white photosensitive area could improve the sensitivity of the array lens module 100. Under this circumstance, adding infrared filter between the lens corresponding to non-black-and-white photosensitive area and the image sensor or painting infrared cut coating (IR coating) on surface of lens could achieve the camera shooting function with one colored and one IR.

Figure 10:
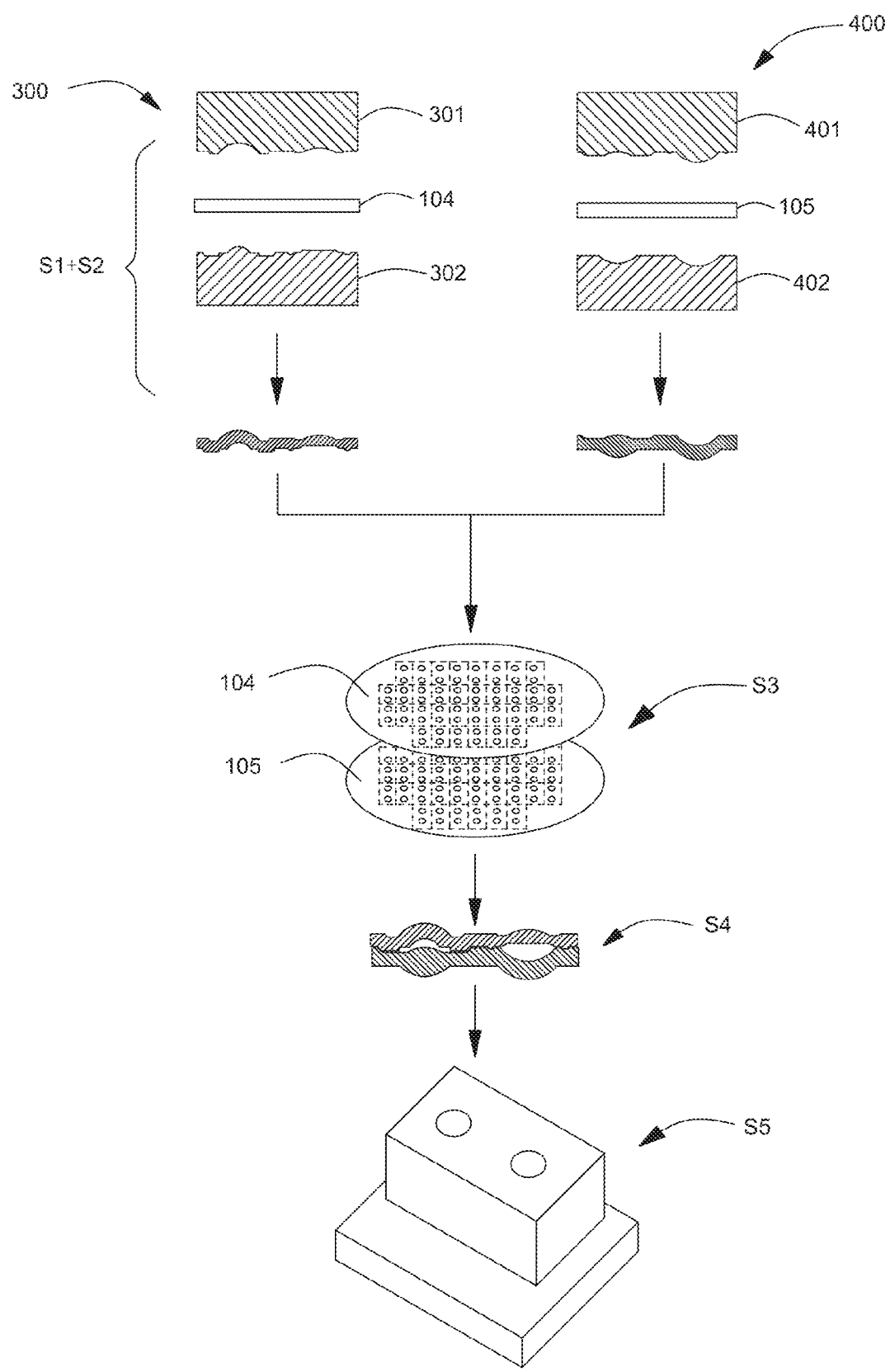
FIG. 10 shows a production flow chart of the array lens module.

FIG. 10 shows the production method to the aforementioned array lens module, and mainly including the following steps:

S1. Provide at least two pieces glass substrates, respectively the first glass substrate 104 and the second glass substrate 105.

S2. Provide one wafer die mold. Because there are two pieces glass substrates in this embodiment example, and the optical characteristics of the two pieces glass substrates are different. Two sets wafer die molds are required. They are respectively defined as the first wafer die mold 300 and the second wafer die mold 400. The first wafer die mold 300 comprises the first upper mold 301 and the first lower mold 302. The first upper mold 301 comprises the first optical surface and the third optical surface array. The first lower mold 302 comprises the second optical surface and the fourth optical surface array. The second wafer die mold 400 comprises the second upper mold 401 and the second lower mold 402. The second upper mold 401 comprises the first optical surface and the third optical surface array. The second lower mold 402 comprises the second optical surface and the fourth optical surface array. The optical surface array on the second lower mold 402 is different from the optical surface array on the first lower mold 302. The optical surface array on the second mold 401 is different from the optical surface mold on the first upper optical surface mold 301.

Put the first glass substrate 104 between the first upper mold 301 and the first lower mold 302, heat up and pressurize to press the first optical lens and the second optical lens array. Put the second glass substrate 105 between the second upper mold 401 and the second upper mold 402, heat up and pressurize to pressure the first optical lens and the second optical lens.

S3. Stack with the first glass substrate 104 and the second glass substrate 105.

S4. Cut the stacked glass substrates according to the dotted lines in Step S3 in FIG. 6, so as to separate the lens module stacked by glass substrates.

S5. Provide the housing to the image sensor comprising the first aperture and the second aperture. Assemble the lens modules separated from Step S4 with the image sensor and seal in the housing.

In addition, this method could also comprise the step of painting antireflection antifogging coating and/or infrared cut coating on the glass substrate before stacking the first glass substrate 104 and the second glass substrate 105. So as to improve the light transmittance and the achromatization performances.

Because the lens module is cut from the stacked glass substrate, the distance between the first lens and the second lens has been determined in production. It will not affect the accuracy of the first lens and the second lens. So it has a high assembling precision and resolution. In addition, the lens module is all-glass construction with a high transmittance and excellent achromatization performances. With flow chart production, the processing and assembling cost is low.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An array lens module comprising:
    a housing,
    an image processor inside the housing,
    an image sensor electrically connected with the image processor, the image sensor having a photosensitive area;
    a lens module set on the image sensor; wherein
    the lens module includes a first lens and the second lens keeping a distance from the first lens, the first lens having a first imaging area, the second lens having a second imaging area, at least part of the first imaging area and the second imaging area falling in the photosensitive area; wherein
    the image processor captures images in the first image area and the second image area by a certain length-width ratio for generating a parallax between images in the first image area and the second image area; and
    wherein the photosensitive area has two relatively parallel first side edges and the second side edge connected with the two first side edges, a connecting line between geometric centers of the first image area and the second image area is parallel to the first side edges.

2. The array lens module according to claim 1, wherein the photosensitive area has two relatively parallel first side edges and the second side edge connected with the two first side edges, a connecting line between geometric centers of the first image area and the second image area is parallel to the side second edge.

3. The array lens module according to claim 1, wherein the photosensitive area is a rectangle, both the first image area and the second image area are in circle.

4. The array lens module according to claim 3, wherein the first image area and the second image area are respectively located at diagonal positions in the photosensitive area.

5. The array lens module according to claim 3, wherein the corresponding areas to the first image area or the second image area on the image sensor are black and white photosensitive areas.

6. The array lens module according to claim 5, wherein an infrared filter is installed between the second lens and the image sensor or between the first lens and the image sensor.

7. The array lens module according to claim 1, wherein a first aperture and a second aperture are respectively formed at positions of the housing corresponding to the first lens and the second lens.

8. The array lens module according to claim 1, wherein a surface of each glass lens is coated with antireflection antifogging coating, the antireflection antifogging coating at least covers the first lens and the second lens.

9. The array lens module according to claim 1, wherein each glass lens comprises a first optical lens and a second optical lens isolated from the first optical lens, positions of the first optical lens and the second optical lens on any two pieces glass lens are corresponding to each other, the first lens comprises the stacked first optical lens, and the optical centers of the first optical lens are mutually aligned; the second lens comprises the stacked second optical lens, and the optical centers of the second optical lens are mutually aligned.

* * * * *